United States Patent [19]
Hannah

[11] 3,934,497
[45] Jan. 27, 1976

[54] APPARATUS FOR COOKING FRUIT AND THE LIKE PRODUCTS

[75] Inventor: Phillip L. Hannah, San Jose, Calif.

[73] Assignee: California Fruit Concentrates, Inc., San Jose, Calif.

[22] Filed: Apr. 17, 1974

[21] Appl. No.: 461,501

[52] U.S. Cl. .................. 99/476; 23/290.5; 99/477; 126/20; 126/348; 126/369; 137/599.1; 426/407; 426/510; 426/523

[51] Int. Cl.² .................. A47J 27/026; A47J 27/04; A47J 27/16

[58] Field of Search .............................. 99/473–477, 99/403; 126/348, 369, 377, 20; 23/290.5; 426/510, 407, , 511, 509, 523, 521; 137/599.1

[56] References Cited
UNITED STATES PATENTS

| | | | |
|---|---|---|---|
| 644,741 | 3/1900 | Guthrie | 137/599 X |
| 843,525 | 2/1907 | Frey | 137/599 |
| 1,565,282 | 12/1925 | Mabee | 426/511 |
| 1,636,768 | 7/1927 | Ford | 26/369 |
| 2,051,391 | 8/1936 | Raney | 99/370 X |
| 2,143,903 | 1/1939 | Wilbur | 426/407 |
| 3,374,096 | 3/1968 | Knock | 426/350 |

FOREIGN PATENTS OR APPLICATIONS

| 11,713 | 4/1913 | United Kingdom | 426/511 |
|---|---|---|---|

Primary Examiner—Frank W. Lutter
Assistant Examiner—N. Greenblum
Attorney, Agent, or Firm—Jack M. Wiseman

[57] ABSTRACT

An apparatus for cooking fruit and the like products includes a tank or cooking chamber disposed for receiving a quantity of such products and a quantity of water sufficient to cover the products therein and sufficient enough to create the necessary back pressure for a hydraulic head and sufficient enough to provide an adequate medium for agitation. Steam is supplied to the lower portion of the tank to raise the temperature of the water to a cooking temperature of the products submerged therein, which temperature may be the boiling point of water. Steam or moisture laden vapor which escapes to an upper surface of the body of water is recirculated under pressure to a lower portion of the tank, such that it will be redirected into the cooking area. Such recirculation is performed by a conduit and a blower or pump mounted in the path of the conduit. The conduit has an inlet above the level of the water in the tank and an outlet below the level of the water adjacent a bottom wall of the tank. The pump effectively increases the pressure of the steam and thereby increases its temperature. A method of cooking fruit and the like products includes submerging such products in a body of water, passing steam through the body of water until it is heated to the cooking temperature of the products, and recirculating under pressure the steam or moisture laden vapor which escapes from an upper surface of the body of water to a lower level thereof.

6 Claims, 1 Drawing Figure

U.S. Patent  Jan. 27, 1976  3,934,497
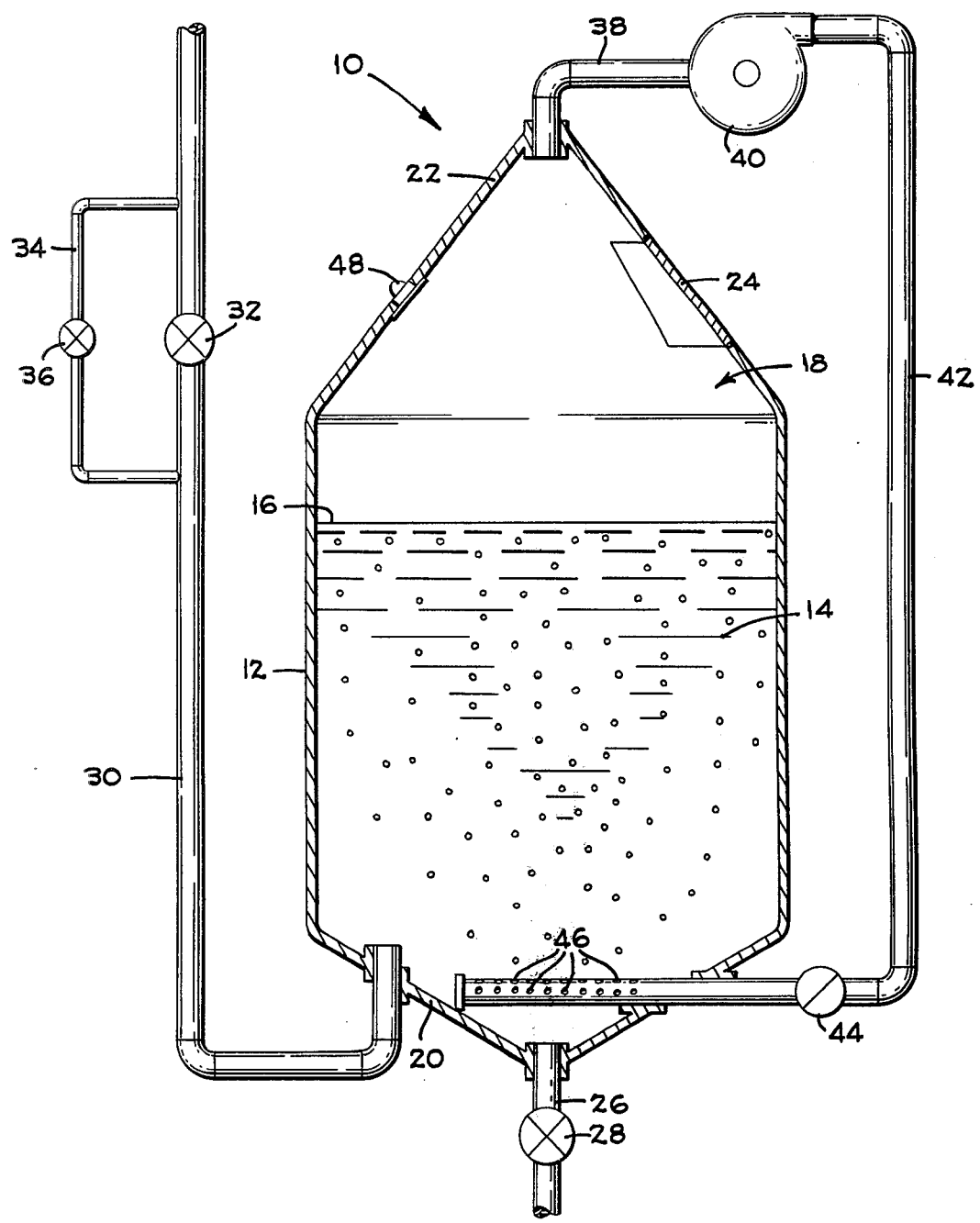

3,934,497

APPARATUS FOR COOKING FRUIT AND THE LIKE PRODUCTS

BACKGROUND OF THE INVENTION

1. Field of the Invention

This invention relates generally to an apparatus for and a method of cooking fruit and the like products, and more particularly to such a cooking apparatus and method which employs steam as a heat exchange medium and as an agitating agent.

2. Prior Art

Steam has been employed extensively for heating and cooking various products. Steam has also been employed in the past for cooking fruit and similar products, such as dates, figs and prunes, for the purpose of liberating the sugar content of such products. The cooking process softens the fruit until it ruptures and exposes the pulp of the fruit to boiling or hot water, thereby liberating, over a predetermined cooking time, the sugar content of the fruit to the water. The resultant homogeneous mixture is refined and dehydrated to a desired fixed level for various commercial purposes. Examples of cooking apparatus which employ steam as a heat exchange medium are found in U.S. Pat. Nos. 1,174,721; 2,885,294; 1,565,282; 474,009; 1,711,729; 1,539,309; 2,020,309; 2,143,903; 2,589,288; 2,654,734; 3,374,096; 3,224,881; 3,764,708; Re.19,868; 3,139,345; and 1,955,289.

Previous methods of cooking fruit and the like products with the steam as the heat exchange medium have been either excessively expensive because of fuel costs or exceedingly slow. In order to obtain a high volume of production, such products must be cooked at the boiling point of water under turbulent conditions for short periods of time. If the cooking time is enlarged, it is likely that the products being cooked will be scorched, thereby effecting the flavor of the finished product. Although this method of cooking fruit produces a relatively high volume production, it requires and consumes relatively large amounts of fuel.

In the cooking of fruit and the like products, the heat may be applied as live steam in direct contact with the products or may be applied indirectly through a heat exchanger. Such indirect heating methods include, for example, the use of closed steam coils, heating compartments in the bottom of a tank, or jacketed tanks. Closed steam coils and jacketed type cooking chambers have distinct disadvantages in that the coil or jacket tends to collect and burn the products being cooked on the heated surface thereof. Furthermore, such devices contribute very little to the agitation that is required to rupture the fruit and expose its pulp to the boiling or hot water in which it is submerged. Accordingly, such devices require mechanical means for producing agitation of the product slurry. Such mechanical agitation is generally unsuccessful due to the presence of a foreign material and pits generally found in raw fruit which material may cause damage to the agitation elements.

By applying live steam which passes through the water in which the products are submerged and by maintaining such water at its boiling point, agitation is enhanced. The velocity of steam escaping from jets in a bottom portion of a cooking tank and the turbulence caused by boiling water generates sufficient agitation to aid in the rupture of the fruit to expose its pulp. This cooking method is capable of producing a relatively high yield in a relatively short time period. It also requires and consumes relatively large amounts of fuel, since a considerable amount of heat is lost by evaporation from the surface of the slurry. Moisture laden vapor or steam necessarily escapes from the surface of the slurry and is vented to the atmosphere, thereby creating a relatively large heat loss. This heat loss must, of course, be resupplied to the slurry to maintain its cooking temperature.

SUMMARY OF THE INVENTION

It is, therefore, one of the primary objects of the present invention to provide an apparatus for and method of cooking fruit and the like products, which apparatus and method recover heat losses and reapply such heat to the cooking chamber.

Another object of the present invention is to provide a cooking apparatus for fruits and the like products which is capable of performing the cooking process in a minimum amount of time and with a minimum amount of fuel for generating heat.

Still another object of the present invention is to provide a cooking apparatus for fruit and the like products which does not require the use of any mechanical means for agitating the slurry being cooked.

A further object of the present invention is to provide a cooking apparatus for fruit and the like products in which heat is applied thereto in the form of live steam in direct contact with the slurry containing the products to be cooked.

These and other objects of the present invention are obtained by the provision of a closed tank which is disposed for receiving a slurry containing the products to be cooked and a quantity of water, means for introducing steam into the slurry contained in the tank, and means for recovering heat loss resulting from evaporation from the surface of the slurry and the steam or the moisture laden vapor escaping therefrom and reapplying such heat under pressure to the slurry.

A feature of the present invention resides in the provision of recirculating means for transporting any steam or moisture laden vapor which escapes from an upper surface of the slurry to a lower portion of the tank and introducing such moisture laden vapor or steam under pressure to the slurry, such that the heat contained therein is transferred thereto.

Another feature of the present invention resides in the provision of means for increasing the temperature of any steam or moisture laden vapor which is recirculated, such as a fluid pump which increases the temperature of the steam or moisture laden vapor by increasing the pressure thereof.

It is readily apparent that the present invention provides the distinct advantage of recovering heat losses and resupplying such heat to the slurry being cooked, such that a considerable savings can be realized in the amount of fuel required to produce the heat necessary for the cooking process.

The invention, however, as well as other objects, features advantages thereof which will be more fully realized and understood from the following detailed description, when taken in conjunction with the accompanying drawing, wherein:

DESCRIPTION OF THE DRAWING

The single FIGURE of an elevation view, partially in section and partially broken away, of a cooking apparatus constructed in accordance with the principles of the present invention.

DETAILED DESCRIPTION OF THE PREFERRED EMBODIMENT

With reference to the single FIGURE in the drawing, there is shown a cooking apparatus constructed in accordance with the principles of the present invention, which is generally designated with the reference numeral 10. The cooking apparatus includes a tank 12 which forms a cooking chamber and is disposed for receiving a quantity of fruit and the like products therein and a quantity of water to form a slurry which is designated with the reference numeral 14. The tank 12 is only partially filled with the slurry 14 to a level which is designated with the reference numeral 16, such that a chamber 18 is provided in an upper portion of the tank 12. A bottom wall 20 and a top wall 22 of the tank 12 are conically shaped. A door 24 is provided in the top wall 22 to permit the tank 12 to be filled with the slurry 14. A conduit 26 extends from the bottom wall 20 and may be provided with a valve or plug 28 therein permitting the removal of the slurry 14 from the tank 12 after it has been cooked.

A conduit 30 is provided with a valve 32 therein and extends into the tank 12 through the bottom wall 20 thereof. The conduit 30 is disposed for supplying steam from a steam supply (not shown) into the tank 12 to heat the slurry 14. A by-pass conduit 34 having a by-pass valve 36 therein is connected in parallel with the valve 32 and is disposed for supplying steam at a reduced rate after the valve 32 has been closed.

A conduit 38 extends from the wall 22 to the inlet of a positive rotary blower or pump 40. The outlet of the blower 40 is connected to one end of a conduit 42 which extends through the bottom wall 20 to a lower portion of the tank 12 and is provided with a check valve 44 therein. An end of the conduit 42 which is mounted within the tank 12 is provided with a plurality of apertures 46. Any steam or moisture laden vapor which accumulates within the chamber 18 is withdrawn via the conduit 38 and the blower 40 and is advanced into the lower portion of the tank 12 and released into the slurry 14 through the apertures 46. A release valve 48 is provided in the upper wall 22 for bleeding any excess of pressure which may result within the chamber 18.

The conduits 38 and 42 and the blower 40 form a recirculation system which permits the recovery of heat which is lost in the form of evaporation and steam or moisture laden vapor escaping from an upper surface of the slurry 14 to be resupplied to the slurry 14. It has been the practice in the past to employ a stack or chimney which extends from the upper wall 22 of the tank 12 to permit the escape of steam or moisture laden vapor from the cooking slurry. A heat loss occurs by virtue of the escaping steam or moisture laden vapor. The present invention, however, accumulates such a steam or moisture laden vapor within the chamber 18 and recirculates such steam or moisture laden vapor into the slurry 14 to recover that heat loss.

In operation, after the slurry 14 has been supplied to the tank 12, the valve 32 is open to introduce the steam under pressure into the slurry 14 and the blower 40 is energized to initiate the recirculation process. When the slurry 14 begins to boil, the valve 32 is closed and the valve 36 is open, such that the rate of steam supplied via the conduit 30 to the slurry 14 is reduced to an amount which is sufficient to compensate for any radiant heat loss. The blower 40 compresses the steam or moisture laden vapor in the conduit 42, thereby increasing its temperature.

In a constructed embodiment of the present invention, the level 16 of the slurry 14 is at the height of 5 feet above the portion of the conduit 42 which is within the tank 12. The steam or moisture laden vapor in the conduit 42 will be presented with a hydraulic head of approximately 5 feet of liquid. At 0.433 psig per foot, a compression of 2.17 psig will result. For every one psi compression, an increase in temperature of approximately 16° Fahrenheit will result. Accordingly, with 5 feet of liquid as the hydraulic head, the steam or moisture laden vapor in the conduit 42 will be increased in temperature by approximately 35° Fahrenheit. Should the blower 40 advance the steam at a rate of 150 cubic feet per minute, it can be readily appreciated that a substantial amount of heat increase will result. With the above example, such a heat increase is substantially sufficient to maintain the slurry 14 at a boiling temperature.

It can be readily appreciated that the steam or moisture laden vapor escaping from the apertures 46 produce agitation which is necessary for rupturing the fruit and exposing its pulp to the boiling or hot water in which it is submerged. It has been found that less steam is required to produce the same yield by employing the apparatus and method of the present invention.

I claim:

1. Apparatus for cooking fruits and the like products in which said fruits are immersed in a body of water to form a slurry, said body of water being sufficient to cover said products to form said slurry and to create the necessary back pressure for an hydraulic head and of sufficient quantity to provide an adequate medium for the agitation of said slurry, said apparatus comprising:
   a. a closed tank disposed for receiving said slurry in a lower portion thereof,
   b. first means for introducing steam into the slurry contained in said tank for bringing said slurry approximately to a cooking temperature,
   c. recirculating means for recirculating under pressure any moisture laden vapor which escapes from an upper surface of the slurry to a lower portion of said tank and into the slurry for heating said slurry and for agitating said slurry, said recirculating means being separate and apart from said first means.

2. The apparatus of claim 1, wherein said tank includes a confined space above the upper surface of the slurry contained therein; and said recirculating means includes a conduit extending from said space to a lower portion of said tank, and means for advancing moisture laden vapor under increased pressure through said conduit for increasing the temperature of the advancing moisture laden vapor.

3. The apparatus of claim 2, wherein said advancing means includes a pump mounted in the path of said conduit.

4. The apparatus of claim 3 and further comprising a check valve mounted in the path of said conduit between said pump and the lower portion of said tank.

5. The apparatus of claim 2, wherein said recirculating means includes a member mounted in the lower portion of said tank and having a plurality of apertures therein, said member being secured to the end of said conduit extending to the lower portion of said tank, such that moisture laden vapor will be introduced into said slurry at spaced locations.

6. The apparatus of claim 1, wherein said first means includes a conduit having a first valve for controlling the flow of steam therethrough, and a by-pass conduit having a second valve for controlling the flow of steam therethrough and connected in parallel with said first valve.

* * * * *